United States Patent [19]

Leiber

[11] Patent Number: 4,491,919
[45] Date of Patent: Jan. 1, 1985

[54] ANTI-SKID REGULATING SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 526,240

[22] Filed: Aug. 25, 1983

[30] Foreign Application Priority Data

Oct. 2, 1982 [DE] Fed. Rep. of Germany ....... 3236534

[51] Int. Cl.³ .............................................. B60T 8/08
[52] U.S. Cl. .................................... 364/426; 303/92; 303/111
[58] Field of Search ................ 364/426, 425; 303/111, 303/92

[56] References Cited

U.S. PATENT DOCUMENTS 4,116,321 9/1978 Miller .............................. 192/103 F
4,345,796 8/1982 Reinecke ............................ 303/111

Primary Examiner—J. V. Truhe
Assistant Examiner—Saul M. Bergmann
Attorney, Agent, or Firm—Edwin E. Greigg

[57] ABSTRACT

An anti-skid regulating system for front-wheel-drive vehicles. The brake circuits are such that the brakes of one front wheel and one rear wheel, especially the rear wheel diagonally opposite that front wheel, are included in one brake circuit. Measurement transducers are assigned only to the front wheels, and the pressure in each brake circuit is regulated in accordance with the wheel behavior of the associated front wheel. In order to prevent an excessive drop in pressure under certain road-surface conditions caused by the tractive engine torque, the braking effect of the engine on the driven wheels is at least reduced, at least temporarily, in the event that the anti-skid regulation comes into effect.

20 Claims, 3 Drawing Figures

ANTI-SKID REGULATING SYSTEM

BACKGROUND OF THE INVENTION

The invention relates to an anti-skid regulating system for front-wheel-drive vehicles, having a brake circuit layout in which one front and one rear wheel is included in each brake circuit. In this anti-skid regulator, measurement transducers for monitoring the wheel motion behavior are assigned only to the front wheels, and the brake pressure in the two brake circuits is regulated individually in accordance with the wheel behavior of the associated front wheel by means of an evaluation circuit to which the signals of the measurement transducer are supplied.

With the ever increasing use of anti-skid regulating systems, attempts are being made to reduce the expense of such systems and to introduce simple systems. The difficulty of attaining the main characteristics of such a system, that is, steerability, vehicle stability and braking distance, with fewer than three regulating channels and without individual sensing of the wheel speed behavior of all the wheels, is well known. For front-wheel-drive vehicles having a diagonal brake circuit layout, the suggestion has been made that there be individual regulation of the pressure at the front wheel brakes, with the regulated pressure being exerted simultaneously at the diagonally opposed rear wheel. This system has not yet proved satisfactory.

OBJECT AND SUMMARY OF THE INVENTION

It is accordingly the object of the invention to augment a simple anti-skid regulating system of the general type discussed above in such a way that it is usable in actual practice.

By means of the invention, the influence of the tractive engine torque, which is superimposed on the braking torque, is reduced at least temporarily during the anti-skid regulation or even eliminated entirely, thereby preventing the pressure from dropping to zero or near zero while driving in a low gear and on ice, which would cause the rear wheel brakes to be incapable of contributing to the braking effect. The essence of the invention is considered to be that instead of attempting to overcome this disadvantage by effecting an improvement within the brake pressure regulation system itself, this end is attained in an unorthodox manner by intervention into a different system of the vehicle.

This intervention may be effected by actuating the clutch via the anti-skid regulator; with automatic transmissions, the transmission is either forced into a high gear, or it is directed into the neutral setting.

In integrated anti-skid braking systems (ABS systems) coming into use in future, a pressure supply is contained in the hydraulic system. This pressure supply can be utilized via a magnetic valve for actuating the clutch cylinder and thus for the purpose of automatic disengagement during ABS operation. As a result, the expense is substantially reduced as compared with that for an otherwise conventional 4-channel system for a diagonal brake circuit layout, since this simpler system contains only two regulating channels and two sensors.

The triggering of the clutch or of the automatic transmission can be performed in accordance with the appearance of regulating signals of the anti-skid regulator; however, the triggering can also be further limited in a timed manner. For instance, the intervention may be made permissible only if the vehicle is operating at a speed higher than some predetermined value (such as 20 km/h). It is also possible to conclude that a low $\mu$ value of the road surface exists, based on the wheel motion behavior, and for the tractive engine torque to be suppressed only if the wheel behavior indicates a corresponding $\mu$ value or if the braking force brought to bear by the brake system is less than a predetermined value (pressure value). Means for accomplishing this are known, for instance from German Offenlegungsschrift No. 22 58 317. The conclusion as to the $\mu$ value can also be made based on the evaluation of the length of time during which the pressure drops.

The re-connection of the engine with the wheels at the end of the shutoff period is preferably not performed abruptly but is instead accomplished in a clocked manner.

The invention will be be better understood and further objects and advantages thereof will become more apparent from the ensuing detailed description of a preferred embodiment taken in conjunction with the drawings.

DESCRIPTION OF THE PREFERRED EMBODIMENT

Figure 1:
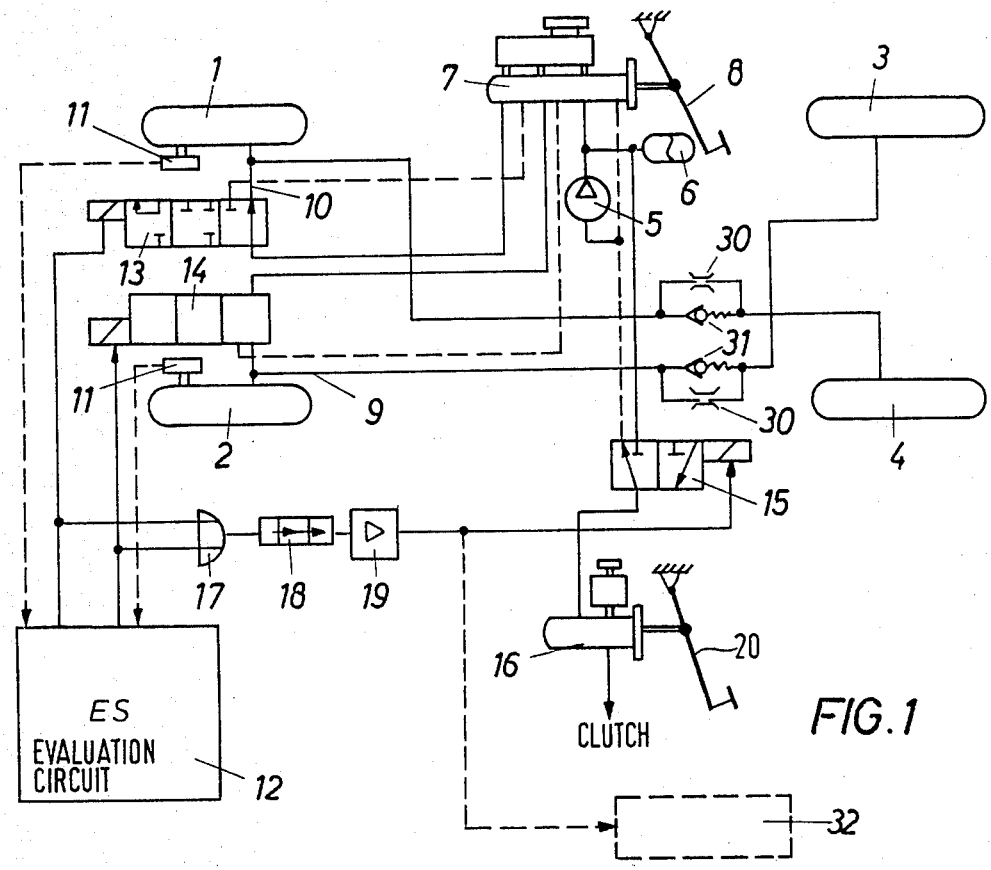
FIG. 1 shows the basic layout of an exemplary embodiment of the invention.
Figure 2:
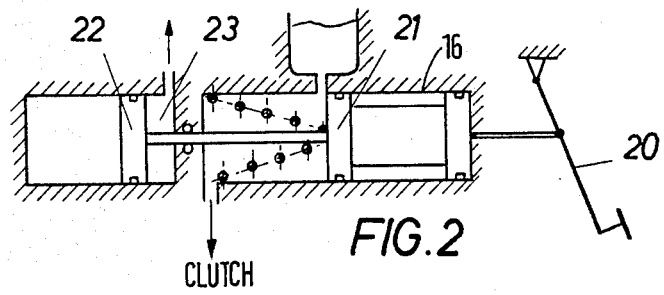
FIGS. 2 and 3 show two alternatives for actuating the clutch.

In FIG. 1, 1 and 2 indicate the driven front wheels of a vehicle, the rear wheels of which are indicated as 3 and 4. The wheels 1 and 4 are located in one brake circuit, and the wheels 2 and 3 are in the other. The brake system of the vehicle comprises a pressure source, containing a pump 5 and a pressure reservoir 6 as well as a braking pressure control unit 7 connected therewith, which upon the actuation of the pedal 8 generates pressure in the brake circuits 9 and 10 connected to it.

Figure 3:
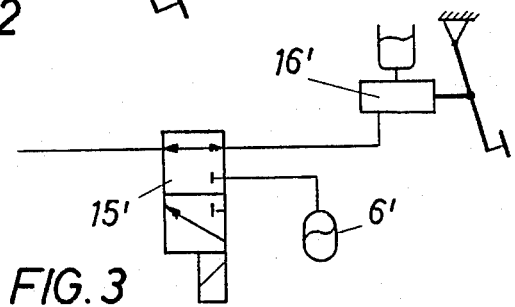

The anti-skid regulating system of the vehicle comprises two measurement transducers 11 assigned to the front wheels 1 and 2, the electrical evaluation circuit 12 shown in block form is a circuit such as shown by FIG. 3 in U.S. Pat. No. 3,754,797 and two three-position valves 13 and 14 correspond to pressure control units which function as an inlet and outlet valve, with which the pressure is regulated individually in the two brake circuits 9 and 10 depending on the behavior of the front wheel included in a given brake circuit. Valves 13 and 14 are shown and described in U.S. Pat. No. 3,980,346.

An auxiliary cylinder of the especially embodied clutch actuation apparatus 16 of the vehicle is connected to the pressure source 5/6 via a two-position valve 15. The two position valve 15 is the same as valves 13 and 14 with the middle section omitted. In one position, valve 15 connects two out of three connections with one another and in another position the valve connects different connections with one another. FIG. 2 shows the possible embodiment of an actuation apparatus of this kind. Shown there are the clutch pedal 20, a conventional clutch piston 21 and an auxiliary piston 22. Via the pedal 20, the clutch piston 21 can also, however, be displaced by directing pressure into the chamber 23 by means of the valve 15, thus actuating the clutch.

The triggering of the valve 15 is effected here upon the appearance of a trigger signal for the valves 13 and/or 14 via an OR gate 17. A timing element 18, which retards the arriving control signal by some period (for instance, 50 msec), has the effect that brief valve control signals are not capable of triggering the clutch actuation. This timing element 18 furthermore has the effect that the valve 15, at the end of a valve control signal, will still remain actuated for a period (for instance, 100 msec). The output signal of the timing element arrives via the power amplifier 19 at the valve 15 and actuates it. Thus, in the illustrated exemplary embodiment, the valve 15 and thereby the clutch are actuated shortly after the appearance of a tendency toward skidding, and this actuation remains in force until shortly after the end of the danger of skidding; that is, the tractive engine torque is rendered ineffective for the entire period.

Combinations of throttles 30 and check valves 31 are also incorporated into the brake lines leading to the rear wheels and are responsible for a rapid buildup of pressure, but a retarded pressure drop at the rear wheel brakes. This retarded pressure drop is beneficial to the braking process.

In FIG. 3 it is shown that the additional clutch cylinder shown in FIG. 2 can be dispensed with if the conventional clutch cylinder 16' or the pressure source 6' is alternatively connected with the clutch by means of the valve 15'.

In the case where there is an automatic transmission 32, the output signal of the amplifier 19 is delivered to this transmission for the sake of switching gears. This possibility is suggested by dashed lines in FIG. 1.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An anti-skid regulating system for front-wheel-drive vehicles having a brake circuit control in which one front wheel and one rear wheel are included in two separate brake circuits, each separate brake circuit includes anti-skid regulator measurement transducers which are assigned only to rotational motion of the front wheels for monitoring the front wheel motion behavior, an evaluation circuit is included to which the signals of the measurement transducer are supplied in which the braking pressure in the two brake circuits is regulated individually in accordance with the wheel behavior of the associated front wheel, influencing means are provided which are triggerable by the evaluation circuit which at least temporarily during an anti-skid regulation at least reduce the braking effect of the engine on the driven front wheels.

2. An anti-skid regulating system as defined by claim 1, in which the influencing means actuate a clutch.

3. An anti-skid regulating system as defined by claim 1, in which the influencing means act upon an automatic transmission.

4. An anti-skid regulating system as defined by claim 3, in which the influencing means regulates the effectiveness of a high gear.

5. An anti-skid regulating system as defined by claim 3, in which the influencing means effect a shift of the transmission into a neutral setting.

6. An anti-skid regulating system as defined by claim 1, in which switching means are provided, which retard the triggering of the influencing means as compared with the initiation of the anti-skid regulation.

7. An anti-skid regulating system as defined by claim 2, in which switching means are provided, which retard the triggering of the influencing means as compared with the initiation of the anti-skid regulation.

8. An anti-skid regulating system as defined by claim 3, in which switching means are provided, which retard the triggering of the influencing means as compared with the initiation of the anti-skid regulation.

9. An anti-skid regulating system as defined by claim 4, in which switching means are provided, which retard the triggering of the influencing means as compared with the initiation of the anti-skid regulation.

10. An anti-skid regulating system as defined by claim 1, in which switching means are provided, which effect a predetermined prolongation of the triggering of said influencing means when the anti-skid regulation is ineffective.

11. An anti-skid regulating system defined by claim 2, in which switching means are provided, which effect a predetermined prolongation of the triggering of said influencing means when the anti-skid regulation is ineffective.

12. An anti-skid regulating system defined by claim 3, in which switching means are provided, which effect a predetermined prolongation of the triggering of said influencing means when the anti-skid regulation is ineffective.

13. An anti-skid regulating system defined by claim 4, in which switching means are provided, which effect a predetermined prolongation of the triggering of said influencing means when the anti-skid regulation is ineffective.

14. An anti-skid regulating system defined by claim 5, in which switching means are provided, which effect a predetermined prolongation of the triggering of said influencing means when the anti-skid regulation is ineffective.

15. An anti-skid regulating system defined by claim 6, in which switching means are provided, which effect a predetermined prolongation of the triggering of said influencing means when the anti-skid regulation is ineffective.

16. An anti-skid regulating system as defined by claim 1, in which blocking means are provided, which prevent the triggering of the influencing means whenever the vehicle speed falls below a predetermined value.

17. An anti-skid regulating system as defined by claim 1, in which the influencing means reestablish the influence of the engine upon the driven wheels in a clocked manner.

18. An anti-skid regulating system as defined by claim 2, in which the influencing means contain a pressure source and a valve, by way of which valve a clutch piston is triggerable.

19. An anti-skid regulating system as defined by claim 1, in which a throttle and a one-way valve which bypasses said throttle and permits a rapid pressure increase to the rear wheel brakes are incorporated into each of the brake lines to the rear wheels.

20. An anti-skid regulating system as defined by claim 1, in which the triggering of the influencing means takes place only when the wheel behavior indicates a low coefficient of adhesion or a low braking force.

* * * * *